(12) United States Patent
Fahimi et al.

(10) Patent No.: US 12,506,372 B2
(45) Date of Patent: Dec. 23, 2025

(54) HIGH TORQUE DENSITY 3D FLUX SEGMENTED-ROTOR SWITCHED RELUCTANCE MACHINE

(71) Applicant: Board of Regents, The University of Texas System, Austin, TX (US)

(72) Inventors: Babak Fahimi, Plano, TX (US); Pengyuan Chen, Richardson, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 385 days.

(21) Appl. No.: 18/337,721

(22) Filed: Jun. 20, 2023

(65) Prior Publication Data

US 2023/0412015 A1 Dec. 21, 2023

Related U.S. Application Data (60) Provisional application No. 63/354,065, filed on Jun. 21, 2022.

(51) Int. Cl.
*H02K 1/24* (2006.01)
*H02K 1/14* (2006.01)
*H02K 11/20* (2016.01)

(52) U.S. Cl.
CPC ............. *H02K 1/246* (2013.01); *H02K 1/14* (2013.01); *H02K 11/20* (2016.01); *H02K 2201/12* (2013.01)

(58) Field of Classification Search
CPC .......... H02K 1/246; H02K 1/14; H02K 11/20; H02K 2201/12; H02K 19/103; H02K 1/148

USPC ........................................................ 310/68 R
See application file for complete search history.

(56) References Cited

U.S. PATENT DOCUMENTS

| | | | | |
|---|---|---|---|---|
| 6,791,222 B1* | 9/2004 | Maslov | ................ | H02K 21/12 310/216.023 |
| 7,554,241 B2* | 6/2009 | Rao | ........................ | H02K 1/12 310/268 |
| 10,833,557 B2* | 11/2020 | Severson | ............... | H02K 11/33 |
| 2006/0273686 A1* | 12/2006 | Edelson | ................... | H02K 3/46 310/83 |
| 2008/0278020 A1* | 11/2008 | Ley | ...................... | H02K 21/222 310/156.01 |
| 2015/0002063 A1* | 1/2015 | Fahimi | ................... | H02K 21/22 318/400.41 |
| 2018/0219464 A1* | 8/2018 | Newmark | ............... | H02K 21/12 |
| 2019/0148998 A1* | 5/2019 | Oner | ...................... | H02K 19/24 310/49.44 |
| 2019/0288584 A1* | 9/2019 | Vansompel | ............ | H02K 9/227 |
| 2020/0350800 A1* | 11/2020 | Hurry | .................... | H02K 5/207 |
| 2021/0067016 A1* | 3/2021 | Hunstable | ............. | H02K 16/02 |

* cited by examiner

*Primary Examiner* — Ahmed Elnakib
(74) *Attorney, Agent, or Firm* — Yee & Associates, P.C.

(57) ABSTRACT

Disclosed is a novel design for an electric machine, segmented-rotor switched reluctance machine (SRSRM). It yields high torque density within the constraints of the volumetric space and can be used in applications in which high torque is required. The volumetric torque density of the disclosed SRSRM is comparable to interior permanent magnet machines (IPMs).

20 Claims, 12 Drawing Sheets

HIGH TORQUE DENSITY 3D FLUX SEGMENTED-ROTOR SWITCHED RELUCTANCE MACHINE

CROSS REFERENCE TO RELATED APPLICATION

Referring to the application data sheet filed herewith, this application claims a benefit of priority under 35 U.S.C. 119(e) from provisional patent application U.S. Ser. No. 63/354,065, filed Jun. 21, 2022, the entire contents of which are hereby expressly incorporated herein by reference for all purposes.

FIELD

The field of the invention is a switched-reluctance machine with exterior rotor exhibiting high torque density and three-dimensional flux segmentation.

BACKGROUND

A switched reluctance motor (SRM) generates torque based on the principle of reluctance torque using a discontinuous rotating magnetic field. Double saliency in a switched reluctance motor, in both the rotor and the stator, causes magnetic reluctance to change with rotor position. A switched reluctance motor is singly excited on the stator and it does not need windings or magnetic excitation on the rotor. As a result, switched reluctance motors provide a low cost and robust structure which makes them desirable for high speed and demanding applications.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments relate to a novel design for an electric machine, segmented-rotor switched reluctance machine (SRSRM). It yields high torque density within the constraints of the volumetric space and can be used in applications in which high torque is required. The volumetric torque density of this new SRSRM is comparable to interior permanent magnet machines (IPMs).

The present embodiments of an electric machine have further advantages in comparison the prior art. Radial flux and axial flux coexist in the present electric machine such that torque raises from radial rotor and both of axial rotors. More torque resources provide a high torque density. Second, in the present embodiments, the volumetric size of end windings is limited since only the conductors of the toroidal windings closed to the shaft do not directly contribute to torque harvest. This is a new feature of the proposed structure in comparison to existing art. In the present embodiments, major parts of toroidal coils contribute to magnetization of the machine for torque generation. Furthermore, the leakage flux and additional thermal stress caused by end windings are inherently suppressed. Third, in the present embodiments, the shape of stator poles and rotor poles are optimized in order to increase torque and minimize magnitude of torque pulsation. Fourth, in the present embodiments, the winding configurations and number of poles are optimized to apply unidirectional excitation for the present electric machine such that asymmetrical switching bridges can be adopted. The cost, rating, and complexity of the power inverter of this machine is lower than a multiphase inverter required by prior art machines.

With reference now to Figures various embodiments of the present invention are illustrated. In particular, with reference to FIGS. 1A, 1B, 1C and 1D a radial cross-sectional view, an exploded view, a radial cross-sectional rotor view and a top end view, respectively, of electric machine 100 is depicted. FIGS. 1A-1D are for an 8 segment stator/14 segment rotor embodiment.

Electric machine 100 includes rotor assembly 101 and stator assembly 102. Rotor assembly 101 comprises a radial rotor 104 and an axial rotor 103. Rotor assembly 101 has rotor magnetic components interspersed with non-magnetic frame components. The rotor magnetic components comprise a set of front axial magnetic rotor segments 132, a set of radial magnetic rotor segments 137 and a set of back axial magnetic rotor segments 139. Non-magnetic frame components of rotor assembly 101 comprise a set of front axial non-magnetic rotor frame segments 121, a set of radial non-magnetic rotor frame segments 128 and a set of back axial non-magnetic rotor frame segments 129.

Set of radial magnetic rotor segments 137 are rigidly attached to set of radial non-magnetic rotor frame segments 128 to form rigid radial rotor 104. Set of front axial magnetic rotor segments 132 are rigidly attached to set of front axial non-magnetic rotor frame segments 121 to form a first planar structure which is rigidly and coaxially attached to the front of radial rotor 104. Set of back axial magnetic rotor segments 139 are rigidly attached to set of back axial non-magnetic rotor frame segments 129 to form a second planar structure. Axial rotor 103 comprises both the first and second planar structures which are coaxially attached to the front and back of radial rotor 104, respectively. To be clear, first and second planar structures are co-planar and perpendicular to the axis of rotation of the electric machine.

Figure 1A:
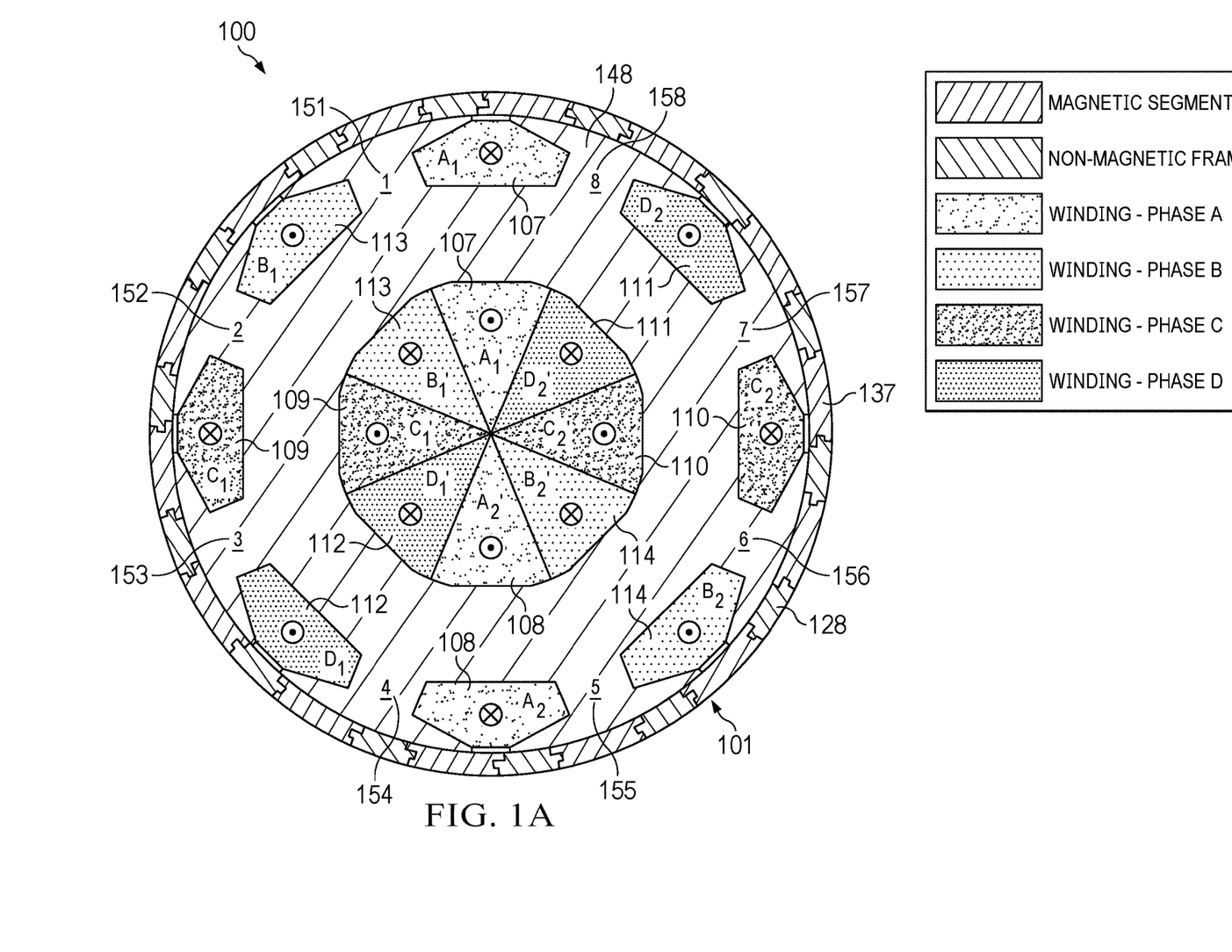
FIG. 1A is an axial cross-section view of an electric machine in accordance with an embodiment of the present invention.
Figure 1B:
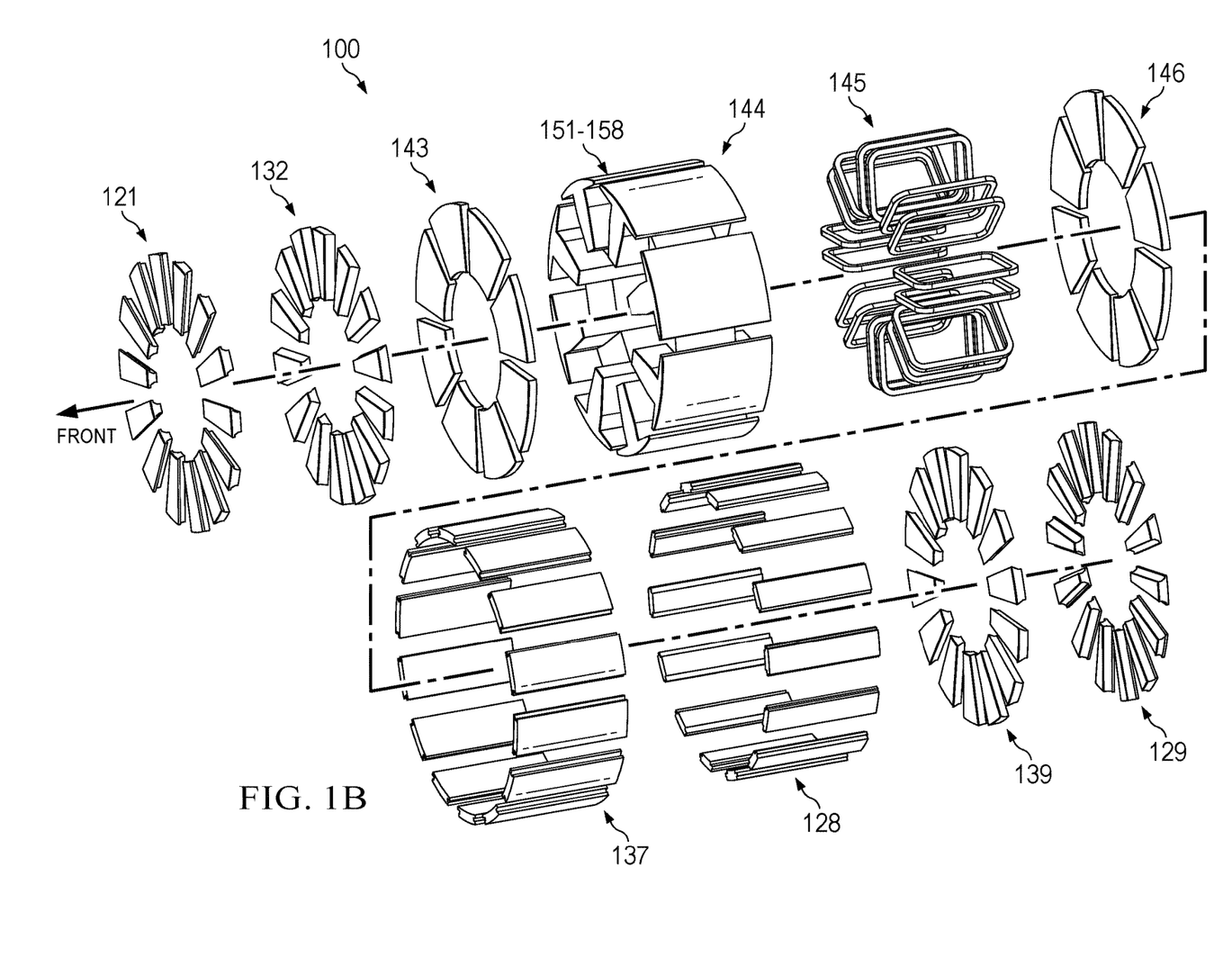
FIG. 1B is an exploded view of an electric machine in accordance with an embodiment of the present invention illustrating 8 stator slots and 14 rotor poles.
Figure 1C:
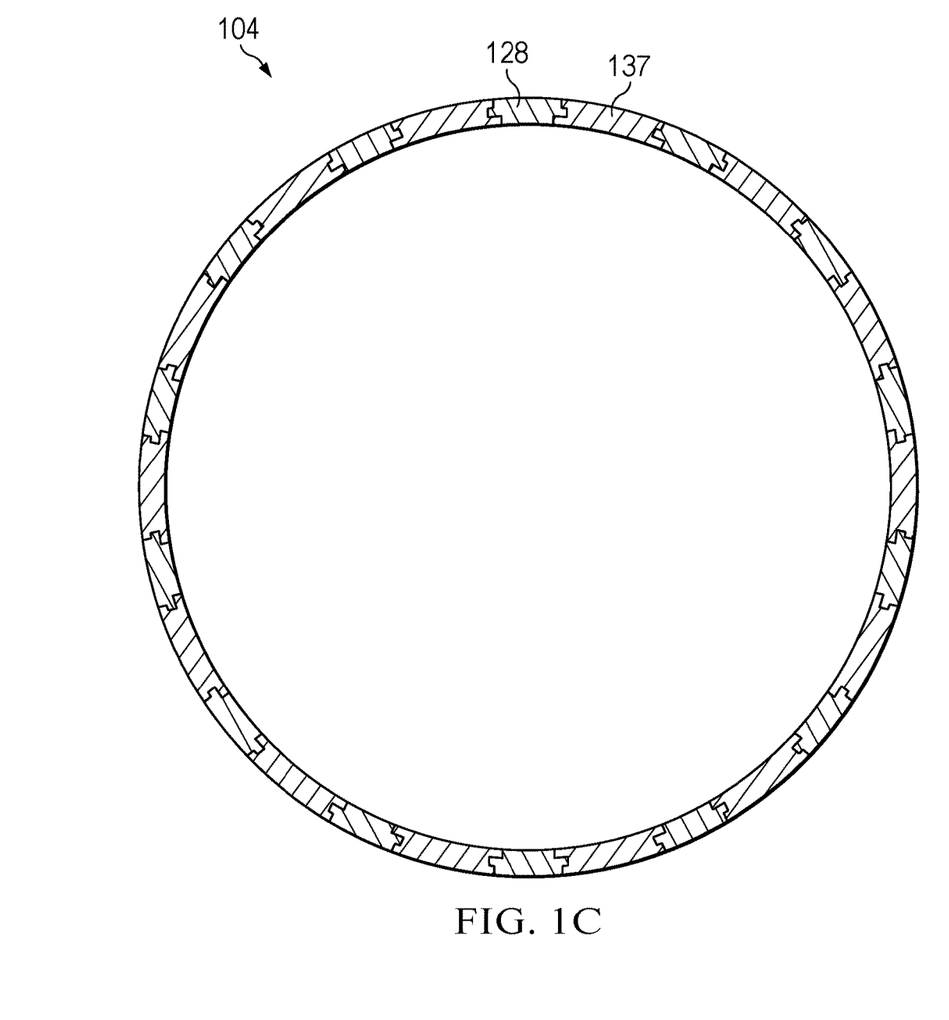
FIG. 1C is a cross-section view of a radial rotor Iin accordance with an embodiment of the present invention.
Figure 1D:
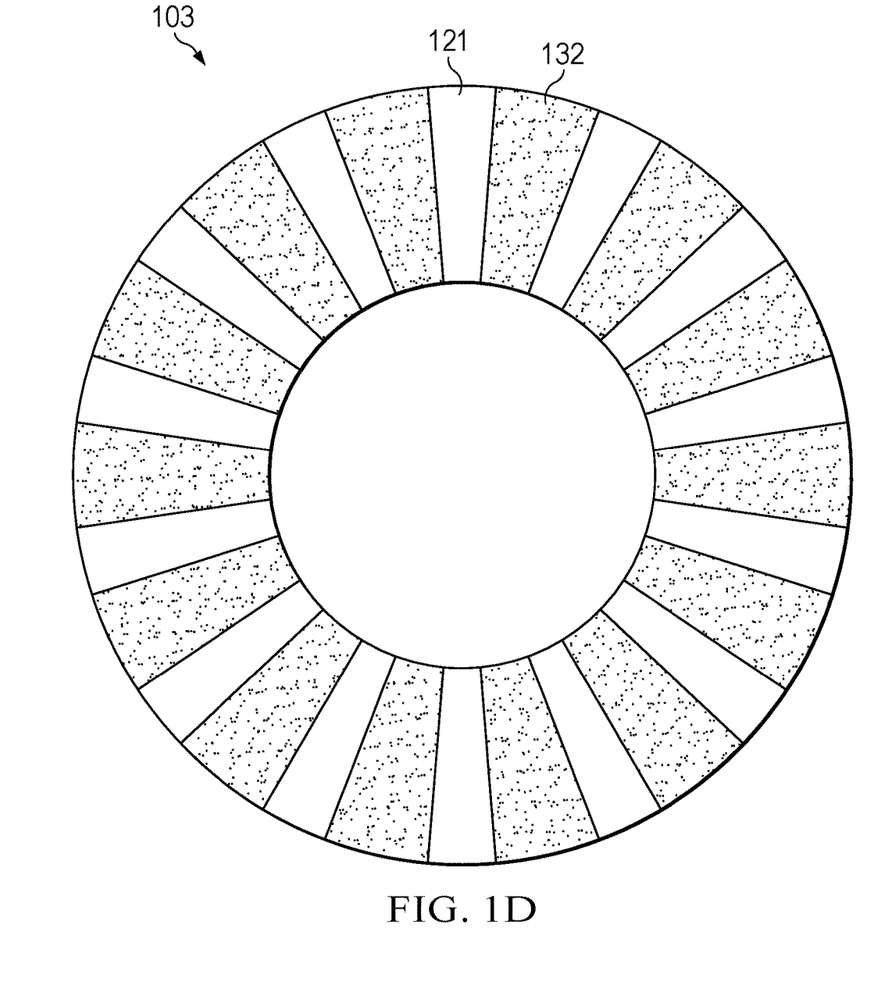
FIG. 1D is a top view of an axial rotor in accordance with an embodiment of the present invention.

Rotor assembly 101 is coaxially and rotationally connected to stator assembly 102. FIG. 1D shows the cross section of the radial rotor and top view of axial rotor. In the embodiment shown, radial rotor has 14 magnetic segments. Magnetic segments (darker shaded segments) are inserted between stainless steel frame (the gray lighter shaded segments). Front of axial rotor 103 has 14 magnetic segments; back of axial rotor 103 has 14 magnetic segments coaligned with those of the front of axial rotor. The whole rotor has 42 magnetic segments inserted in the non-magnetic rotor frame. In this embodiment there are 8 stator slots. Both of radial flux and tangential direction flux coexist in the new machine. The shape of magnetic segments and non-magnetic frame (stainless steel segments) are concaved to increase the average torque and reduce the torque ripple.

Stator assembly 102 includes a set of front axial stator poles 143, radial stator 144 comprising radial stator poles 151-158 interconnected by a set of flux tubes 148, a set of phase windings 145 and a set of back axial stator poles 146. The set of front axial stator poles are rigidly attached to the front of radial stator 144 wherein an individual front axial stator pole is centered on an individual flux tube. The set of back axial stator poles are rigidly attached to the back of radial stator 144 wherein an individual back axial stator pole is centered on an individual flux tube. Set of phase windings 145 are disposed between radial stator poles 151-158 and around the set of flux tubes 148 in radial stator 144. In the embodiment shown in FIGS. 1A-1D, the stator comprises 8 radial poles, 16 axial poles (8 front stator poles, 8 back stator poles) and 8 flux tubes.

Referring again to FIGS. 1A and 1B, phase windings 145 are further described as follows. Electric machine 100 has four phases and 8 toroidal windings. Each phase has two windings. Each stator pole can be simultaneously energized by two different phase windings.

Winding $A_1$—Phase A:
Winding $A_1$-$A_1$' 107 is wound around the flux tube on the right of the No. 1 stator pole 151.
Winding $A_2$—Phase A:
Winding $A_2$-$A_2$' 108 is wound around the flux tube on the right of the No. 5 stator pole 155.
Winding $B_1$—Phase B:
Winding $B_1$-$B_1$' 113 is wound around the flux tube on the right of the No. 2 stator pole 152.
Winding $B_2$—Phase B:
Winding $B_2$-$B_2$' 114 is wound around the flux tube on the right of the No. 6 stator pole 156.
Winding $C_1$—Phase C:
Winding $C_1$-$C_1$' 109 is wound around the flux tube on the right of the No. 3 stator pole 153.
Winding $C_2$—Phase C:
Winding $C_2$-$C_2$' 110 is wound around the flux tube on the right of the No. 7 stator pole 157.
Winding $D_1$—Phase D:
Winding $D_1$-$D_1$' 112 is wound around the flux tube on the right of the No. 4 stator pole 154.
Winding $D_2$—Phase D:
Winding $D_2$-$D_2$' 111 is wound around the flux tube on the right of the No. 8 stator pole 158.

The basic principles of the machine are as follows. Electric machine 100 is designed to harvest maximum average torque and operates with the double phase excitation mode. At any time, there are two excited phases to form the shortest magnetic path such that the reluctance of magnetic paths can be minimized. While rotor segments move towards the positions offering minimal magnetic reluctance, the positive reluctance torque is harvested. A larger difference between unaligned position reluctance and aligned position reluctance yields a higher reluctance torque. Due to the magnetic segments, only local magnetic paths can be formed such that mutual coupling between different phases can be ignored. The phase voltage equation is given as $$V_m = R_m i_m + \omega_r \frac{\partial^2 W_{co}}{\partial i_m \partial \theta} \qquad \text{Eq.1}$$

in which, $V_m$ is voltage, $R_m$ is winding resistance, $i_m$ is the phase current, $\lambda_m$ is flux linkage, $\theta$ is rotor position, $\omega_r$ is the rotor speed, and $W_{co}$ is the co-energy.

The back electromotive force (back emf) is the second term of Eq. 1 where m could be any phase. The back EMF of a phase winding is majorly determined by its own excitation since the magnetic paths of each phase is localized. To harvest maximum available reluctance torque, two of four phases can be excited. This is because there are always four of radial rotor segments and eight of axial rotor segments moving towards the direction of minimizing magnetic reluctance.

Since electric machine 100 has 14 combined poles on rotor and 8 combined poles on stator, one electrical cycle is equal to 12.857 mechanical degrees. One effective stroke is 6.4286 mechanical degrees. Each electrical cycle contains two effective strokes. The winding configuration is designed to operate the machine with the unipolar excitation, which only require asymmetric switch bridges. This can reduce the cost of the entire propulsion system.

Figure 2:
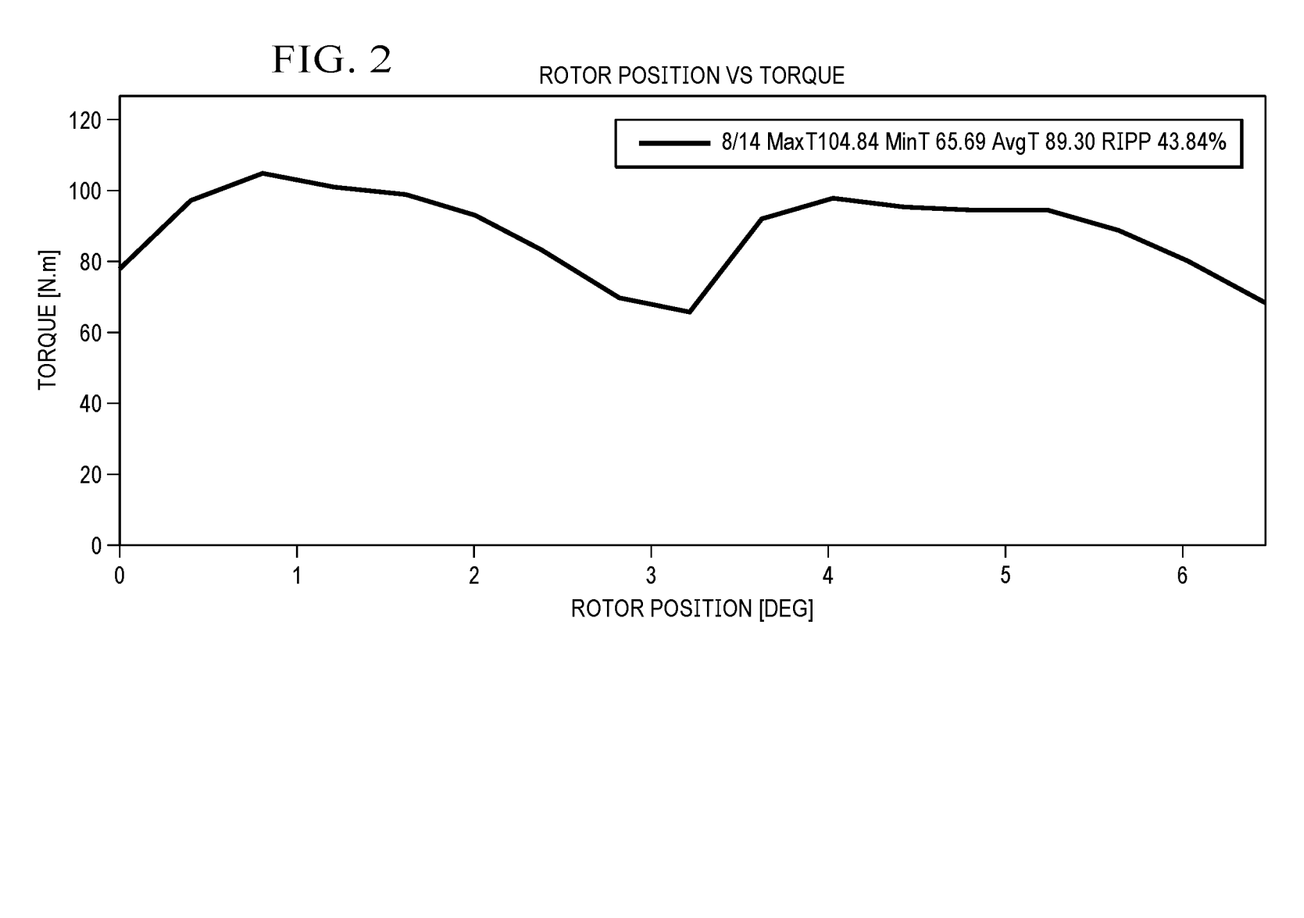
FIG. 2 is graph of the torque profile of one electric cycle for an electric machine in accordance with an embodiment of the present invention.
Figure 3:
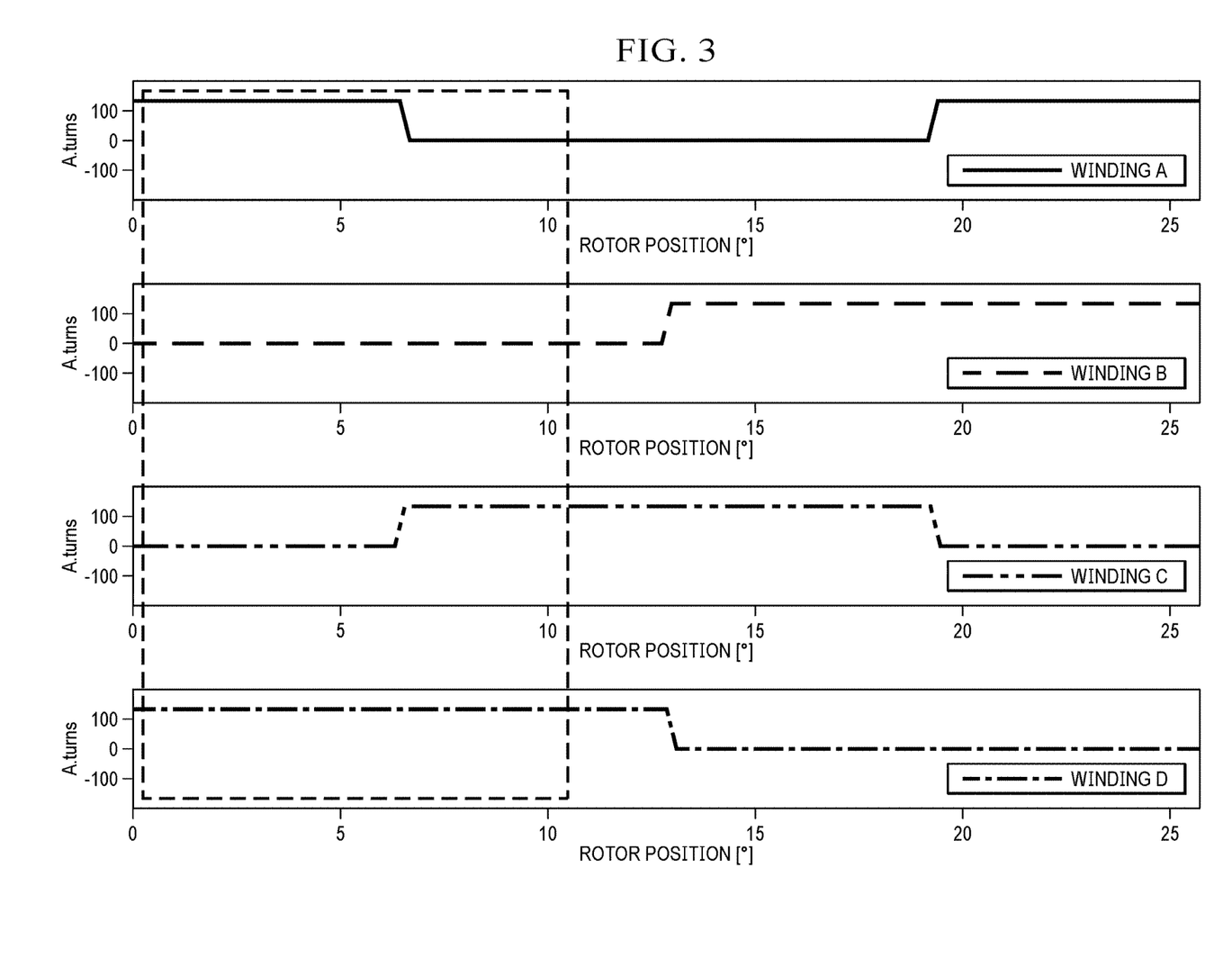
FIG. 3 is a set of graphs of showing the full excitation sequence in overload condition for an electric machine in accordance with an embodiment of the present invention.

The overload torque profile of the new machine is shown in FIG. 2. In each electrical cycle, one phase excitation is constantly on. Two other different phases will be alternatively on in the first and second half electrical cycles. The full excitation sequence under the overload condition is shown in FIG. 3. The time window encircled by the dashed bracket is the time window shown in FIG. 2.

Figure 4:
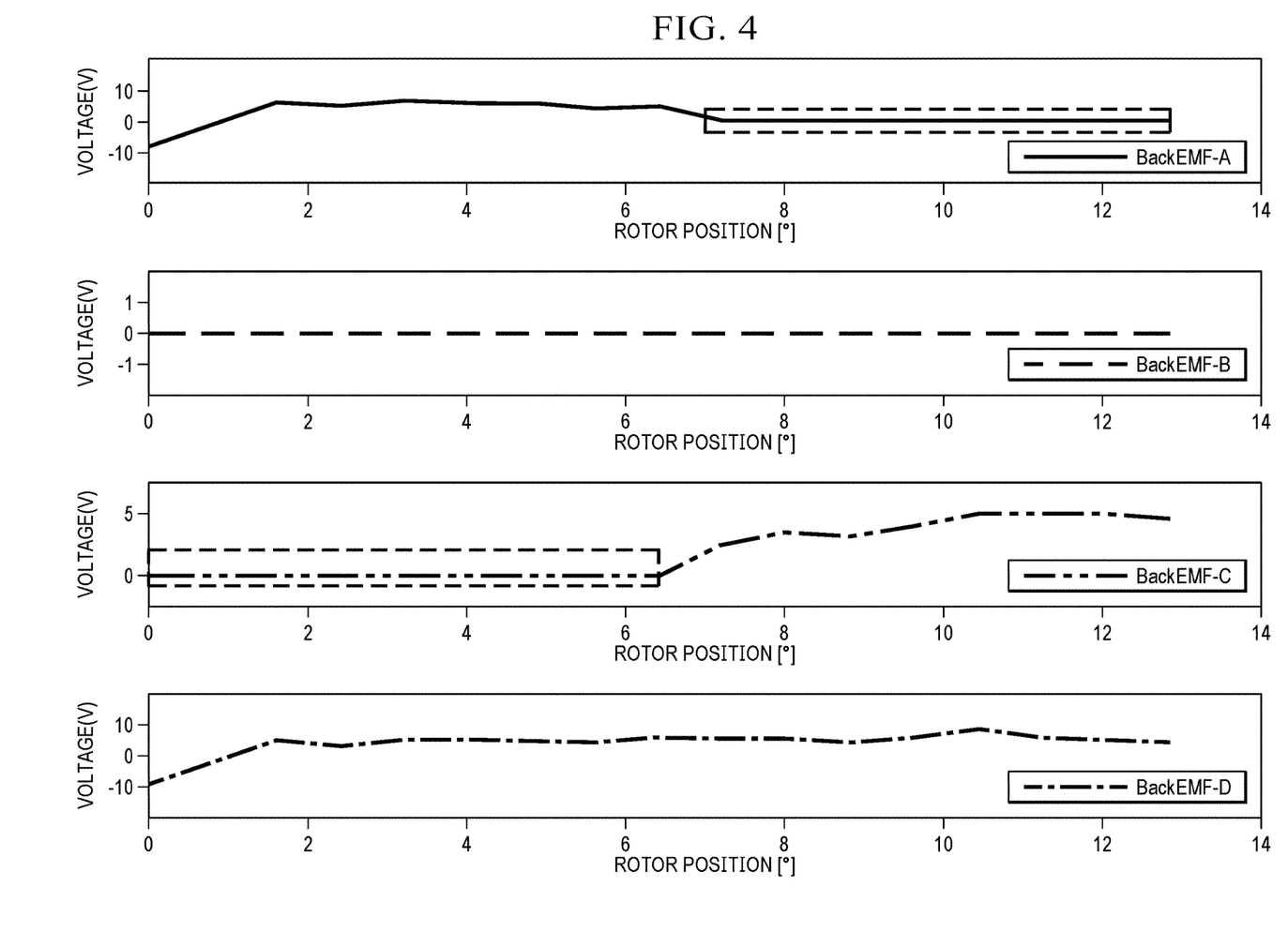
FIG. 4 is a set of graphs of the back EMF of four phases in the first electrical cycle of an electric machine in accordance with an embodiment of the present invention.
Figure 5:
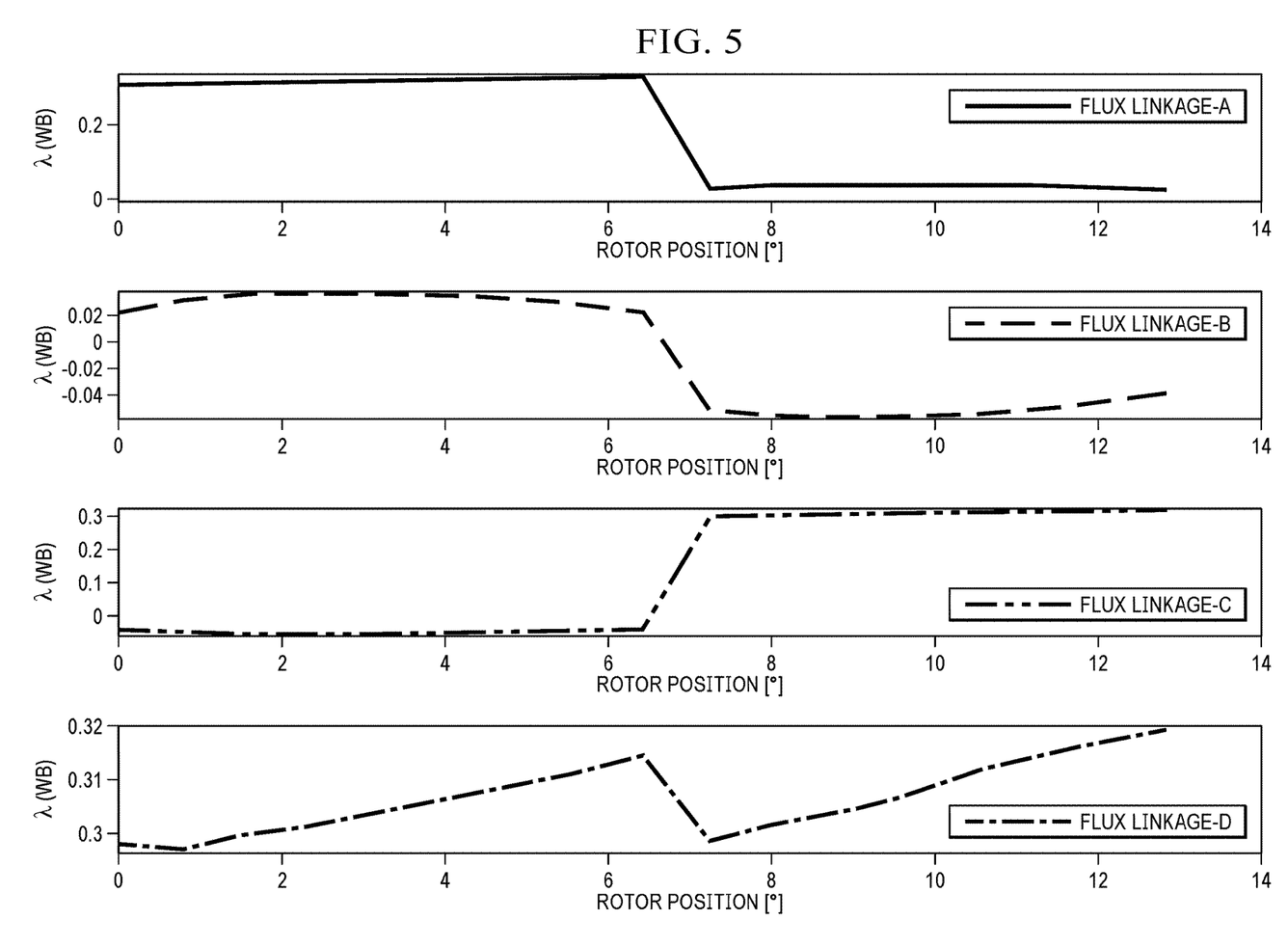
FIG. 5 is a set of graphs of flux linkages of four phases in the first electrical cycle of an electric machine in accordance with an embodiment of the present invention.

The machine has four phases so two of four phases will be always on. To correctly operate this machine, two adjacent phases out of the four phases must simultaneously conduct in order to form a reasonable flux. Otherwise, the flux from single phase winding will create circulation flux in the stator and will not contribute to the generation of torque. FIGS. 4 and 5, respectively, show the back EMFs, and flux linkages of phases A-D versus rotor position @ 267.83 rpm for one electrical cycle. Note that irrelevant data of back EMFs have been reset to zero and encircled by dashed brackets. The encircled back EMF regions denote the negative torque zones of phases. During these periods, phases should not be excited to avoid generating negative torque. Moreover, the voltage of phases in those periods will be clamped by the DC bus voltage such that the back EMF of those periods are not important. To clarify the field behavior, FIG. 6 shows the flux vectors in the rotor and stator when the rotor angle is 2.4105 deg.

Figure 6:
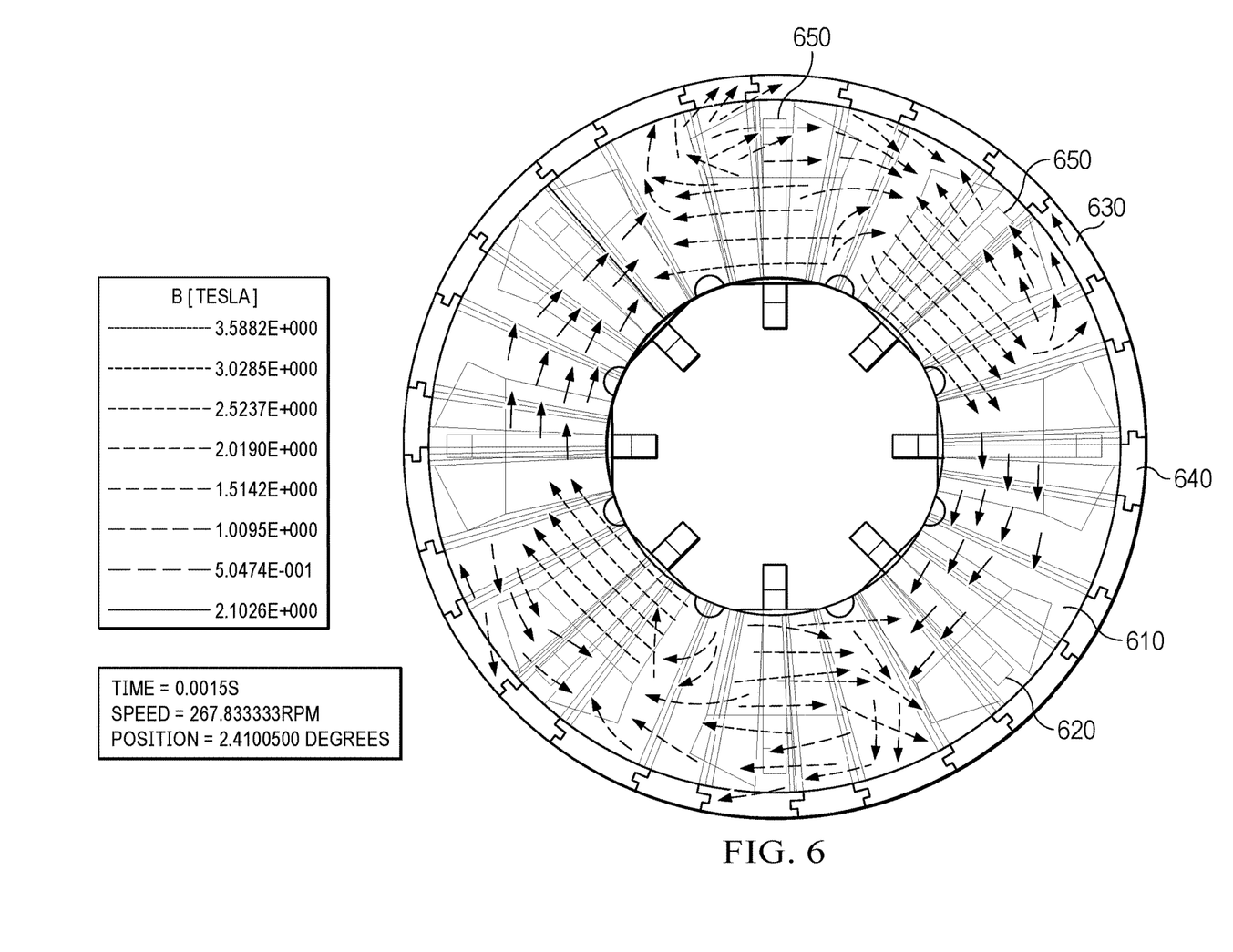
FIG. 6 is a cross-section view of an electric motor, at a particular position, showing a flux vector map.

Referring to FIG. 6, a segmented-rotor switched reluctance electric machine includes a plurality of stators 610 alternating with a plurality of coil windings 620. The rotor includes a plurality of rotor magnetic segments 630 and a plurality of rotor non-magnetic frames 640. Excited windings 650 are adjacent to one another and can be functionally fingerprinted by their magnetic signature with respect to time as well as spatial three dimensions. It can be appreciated that there are another pair of excited coil windings cylindrically symmetrically opposite excited windings 650. This embodiment of the segmented-rotor switched reluctance electric machine has 8 stator slots and 14 rotor polls. TABLE I shows the comparison between disclosed design (08/14 stator slot/rotor pole embodiment) and the $3^{rd}$ generation of electric machine which is used in Toyota Prius. TABLE II shows the machine parameters at the rated condition.

TABLE 1

|  | Present Design (SRSRM) | P3G IPMSM |
| --- | --- | --- |
| Active Diameter (mm) | 184 | 264 |
| Active length (mm) | 96 | 108 |
| Stack length (mm) | 96 | 50 |
| Winding type | Short pitch | Full pitch |
| Slot fill factor | 50% | 56% |
| Number of stator slot | 8 | 48 |
| Number of rotor pole | 14 | 8 |
| Iron weight (Kg) | 8.2 | 16.3 |
| Copper Weight (Kg) | 4.8 | 4.93 |
| Magnet Weight (kg) | N/A | 0.768 |
| Peak torque (N · m) at 20 (A/mm$^2$) | 104.84 | 207 |
| Maximum torque density (N · m/L) | 34.98 | 35 |
| Torque weight ratio (N · m/Kg) | 6.86 | 9.3 |

TABLE II

|  | Present Design (SRSRM) |
| --- | --- |
| Volumetric Size (Liters) | 2.55 |
| Rated torque (N · m) at 5 (A/mm$^2$) | 41.3 |
| Rated torque density (N · m/L) | 16.2 |
| Torque weight ratio (N · m/Kg) | 3.18 |
| Torque ripple (%) | 55% |

The proposed machine structure can be applied for different stator slot/rotor pole configurations, for example, 06/10, 06/14, 12/14. The exploded views of these example pole configurations are shown in FIG. 7 (6 stator slots and 10 rotor poles), FIG. 8 (6 stator slots and 14 rotor poles) and FIG. 9 (12 stator slots and 14 rotor poles).

Figure 7:
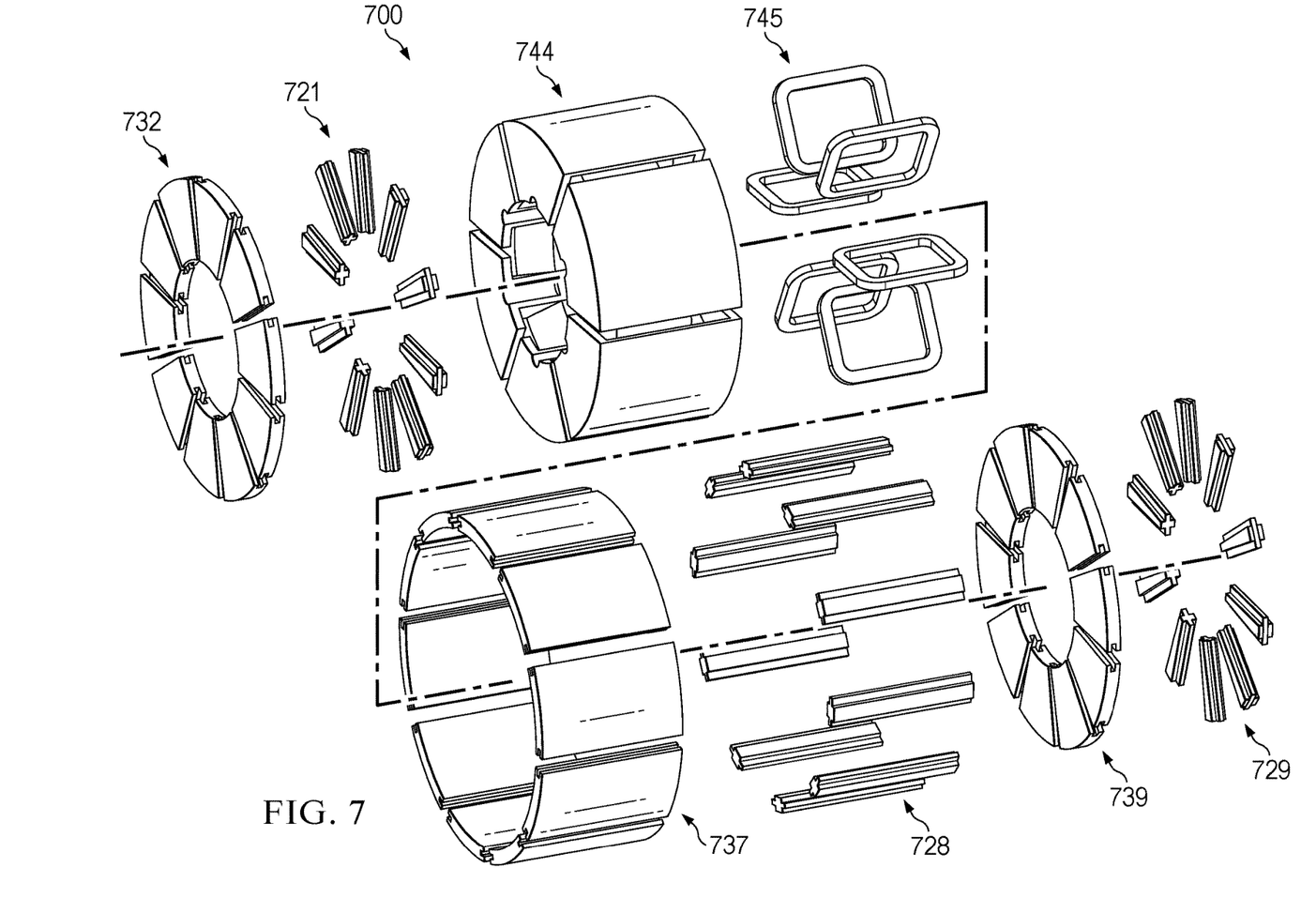
FIG. 7 is an exploded view of an electric machine in accordance with an embodiment of the present invention illustrating 6 stator slots and 10 rotor poles.

Referring to FIG. 7, electric machine 700 includes a rotor assembly and a stator assembly. Rotor assembly comprises a radial rotor and a pair of axial rotors. Rotor assembly has rotor magnetic components interspersed with non-magnetic frame components. The rotor magnetic components comprise a set of front axial magnetic rotor segments 732, a set of radial magnetic rotor segments 737 and a set of back axial magnetic rotor segments 739. Non-magnetic frame components of the rotor assembly include a set of front axial non-magnetic rotor frame segments 721, a set of radial non-magnetic rotor frame segments 728 and a set of back axial non-magnetic rotor frame segments 729.

Set of radial magnetic rotor segments 737 are rigidly attached to set of radial non-magnetic rotor frame segments 728 to form rigid radial rotor. Set of front axial magnetic rotor segments 732 are rigidly attached to set of front axial non-magnetic rotor frame segments 721 to form a first planar structure which is rigidly and coaxially attached to the front of radial rotor. Set of back axial magnetic rotor segments 739 are rigidly attached to set of back axial non-magnetic rotor frame segments 729 to form a second planar structure. Axial rotor comprises both the first and second planar structures which are coaxially attached to the front and back of radial rotor, respectively. These first and second planar structures are co-planar and perpendicular to the axis of rotation of the electric machine.

Rotor assembly is coaxially and rotationally connected to stator assembly. In the embodiment shown in FIG. 7, the radial rotor has 10 magnetic segments. Magnetic segments (darker shaded segments) are inserted between stainless steel frame segments (the gray lighter shaded segments). Front of axial rotor has 10 magnetic segments; back of axial rotor has 10 magnetic segments coaligned with those of the front of axial rotor. The whole rotor has 30 magnetic segments inserted in the non-magnetic rotor frame. In this embodiment there are 6 stator slots. Of note, both radial flux and tangential direction flux coexist in machine 700. In embodiments, the shape of magnetic segments and non-magnetic frame (stainless steel segments) are concaved to increase the average torque and reduce the torque ripple.

Stator assembly includes radial stator 744 comprising radial stator poles interconnected by a set of flux tubes, and a set of phase windings 745. Set of phase windings 745 are disposed between radial stator poles and around the set of flux tubes in radial stator 744.

Figure 8:
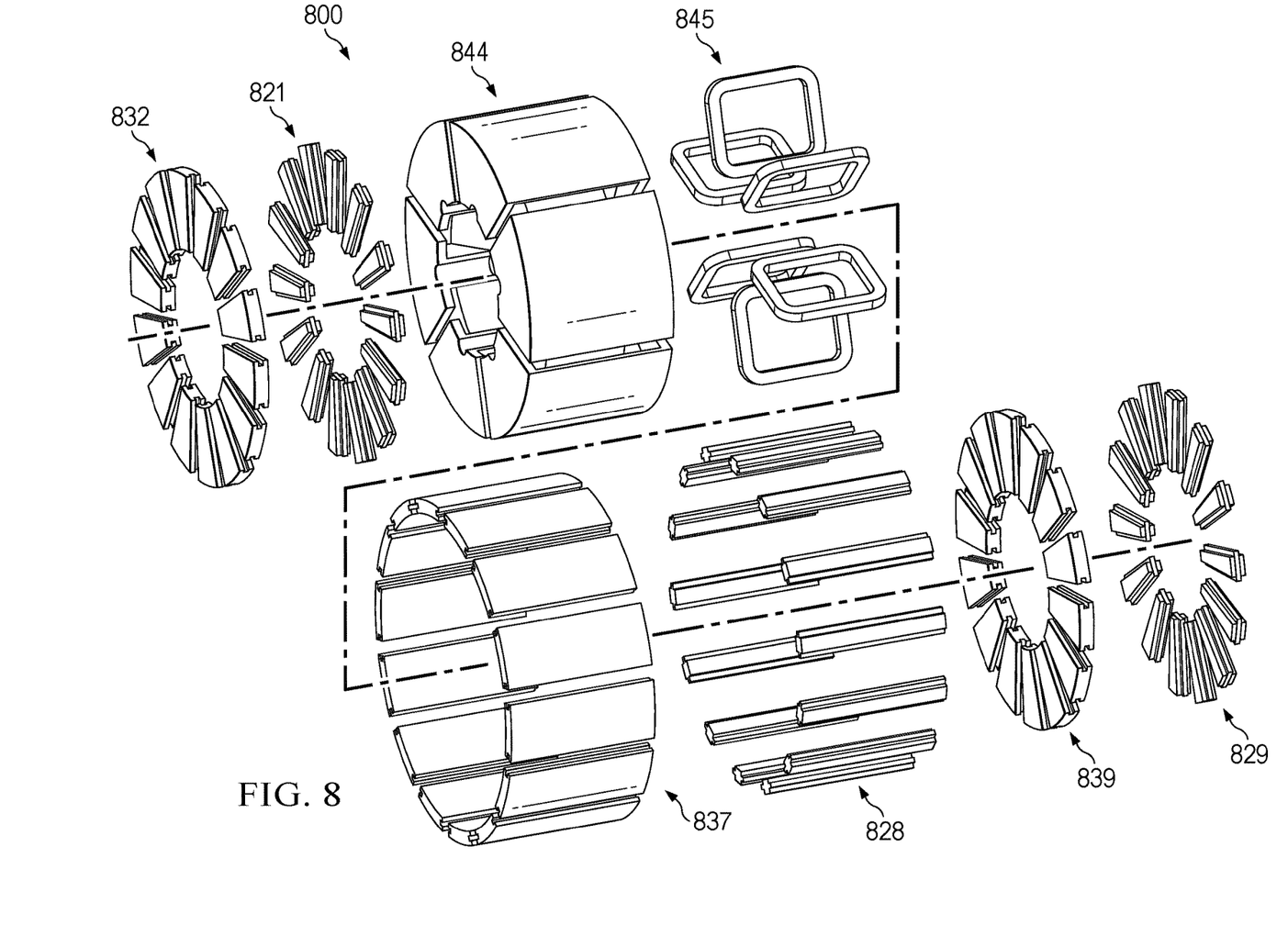
FIG. 8 is an exploded view of an electric machine in accordance with an embodiment of the present invention illustrating 6 stator slots and 14 rotor poles.

Referring to FIG. 8, electric machine 800 includes a rotor assembly and a stator assembly. Rotor assembly comprises a radial rotor and a pair of axial rotors. Rotor assembly has rotor magnetic components interspersed with non-magnetic frame components. The rotor magnetic components comprise a set of front axial magnetic rotor segments 832, a set of radial magnetic rotor segments 837 and a set of back axial magnetic rotor segments 839. Non-magnetic frame components of the rotor assembly include a set of front axial non-magnetic rotor frame segments 821, a set of radial non-magnetic rotor frame segments 828 and a set of back axial non-magnetic rotor frame segments 829.

Set of radial magnetic rotor segments 837 are rigidly attached to set of radial non-magnetic rotor frame segments 828 to form rigid radial rotor. Set of front axial magnetic rotor segments 832 are rigidly attached to set of front axial non-magnetic rotor frame segments 821 to form a first planar structure which is rigidly and coaxially attached to the front of radial rotor. Set of back axial magnetic rotor segments 839 are rigidly attached to set of back axial non-magnetic rotor frame segments 829 to form a second planar structure. Axial rotor comprises both the first and second planar structures which are coaxially attached to the front and back of radial rotor, respectively. These first and second planar structures are co-planar and perpendicular to the axis of rotation of the electric machine.

Rotor assembly is coaxially and rotationally connected to stator assembly. In the embodiment shown in FIG. 8, the radial rotor has 14 magnetic segments. Magnetic segments (darker shaded segments) are inserted between stainless steel frame segments (the gray lighter shaded segments). Front of axial rotor has 14 magnetic segments; back of axial rotor has 14 magnetic segments coaligned with those of the front of axial rotor. The whole rotor has 42 magnetic segments inserted in the non-magnetic rotor frame. In this embodiment there are 6 stator slots. Of note, both radial flux and tangential direction flux coexist in machine 800. In embodiments, the shape of magnetic segments and non-magnetic frame (stainless steel segments) are concaved to increase the average torque and reduce the torque ripple.

Stator assembly includes radial stator 844 comprising radial stator poles interconnected by a set of flux tubes, and a set of phase windings 845. Set of phase windings 845 are disposed between radial stator poles and around the set of flux tubes in radial stator 844.

Figure 9:
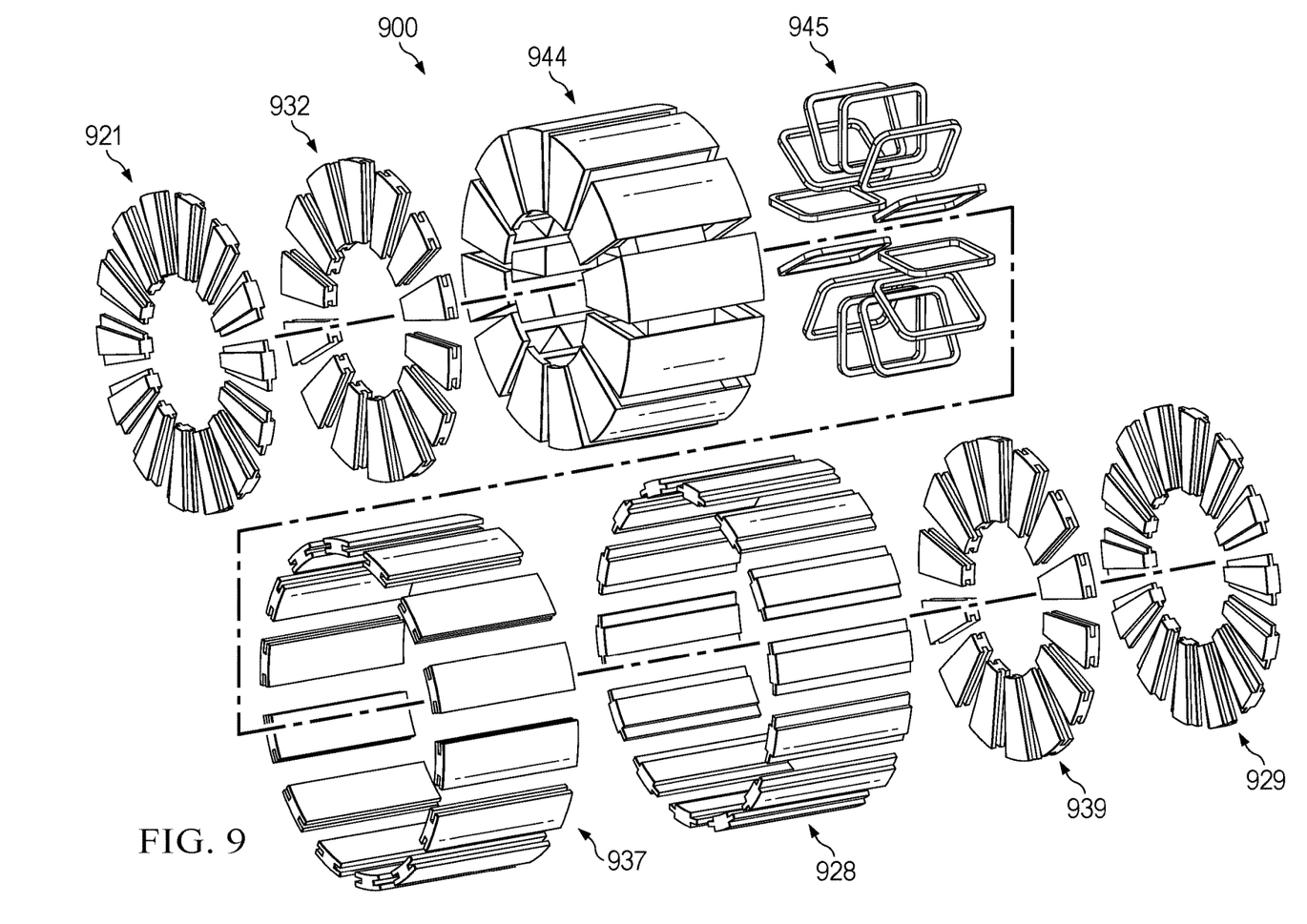
FIG. 9 is an exploded view of an electric machine in accordance with an embodiment of the present invention illustrating 12 stator slots and 14 rotor poles.

Referring to FIG. 9, electric machine 900 includes a rotor assembly and a stator assembly. Rotor assembly comprises a radial rotor and a pair of axial rotors. Rotor assembly has rotor magnetic components interspersed with non-magnetic frame components. The rotor magnetic components comprise a set of front axial magnetic rotor segments 932, a set of radial magnetic rotor segments 937 and a set of back axial magnetic rotor segments 939. Non-magnetic frame components of the rotor assembly include a set of front axial non-magnetic rotor frame segments 921, a set of radial non-magnetic rotor frame segments 928 and a set of back axial non-magnetic rotor frame segments 929.

Set of radial magnetic rotor segments 937 are rigidly attached to set of radial non-magnetic rotor frame segments 928 to form rigid radial rotor. Set of front axial magnetic rotor segments 932 are rigidly attached to set of front axial non-magnetic rotor frame segments 921 to form a first planar structure which is rigidly and coaxially attached to the front of radial rotor. Set of back axial magnetic rotor segments 939 are rigidly attached to set of back axial non-magnetic rotor frame segments 929 to form a second planar structure. Axial rotor comprises both the first and second planar structures which are coaxially attached to the front and back of radial rotor, respectively. The first and second planar structures are co-planar and perpendicular to the axis of rotation of the electric machine.

Rotor assembly is coaxially and rotationally connected to stator assembly. In the embodiment shown in FIG. 9, the radial rotor has 14 magnetic segments. Magnetic segments (darker shaded segments) are inserted between stainless steel frame segments (the gray lighter shaded segments). Front of axial rotor has 14 magnetic segments; back of axial rotor has 14 magnetic segments coaligned with those of the front of axial rotor. The whole rotor has 42 magnetic segments inserted in the non-magnetic rotor frame. In this embodiment there are 12 stator slots. Of note, both radial flux and tangential direction flux coexist in machine 900. In embodiments, the shape of magnetic segments and non-magnetic frame (stainless steel segments) are concaved to increase the average torque and reduce the torque ripple.

Stator assembly includes radial stator 944 comprising radial stator poles interconnected by a set of flux tubes, and a set of phase windings 945. Set of phase windings 945 are disposed between radial stator poles and around the set of flux tubes in radial stator 944.

Depending on the actual demands of applications, the according stator slot/rotor pole configuration can be selected. The stator slot/rotor pole configurations shown in FIGS. 1B and 7-9 are non-limiting examples of possible selections.

The descriptions of the various embodiments of the present invention have been presented for purposes of illustration, but are not intended to be exhaustive or limited to the embodiments disclosed or claimed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A segmented-rotor switched reluctance electric machine, comprising:
    a stator comprising a plurality of stator slots;
    a plurality of stator coil windings, each of the plurality of stator coil windings located in one of the plurality of stator slots; and
    a segmented rotor comprising a plurality of radial magnetic elements, a first plurality of axial magnetic elements, and a second plurality of axial magnetic elements,
    wherein concurrently exciting two adjacent stator coil windings of the segmented-rotor switched reluctance electric machine using 2 different phases of a four phase circuit causes torque to raise simultaneously from the plurality of radial magnetic elements, the first plurality of axial magnetic elements, and the second plurality of axial magnetic elements when cooperatively operating in conjunction with the two adjacent stator coil windings.

2. The segmented-rotor switched reluctance electric machine of claim 1, further comprising a plurality of from axial stator poles coupled to the stator and a plurality of back axial stator poles coupled to the stator.

3. The segmented-rotor switched reluctance electric machine of claim 1, wherein only conductors of the stator coil windings close to a shaft of the segmented-rotor switched reluctance electric machine do not directly contribute to torque harvest.

4. The segmented-rotor switched reluctance electric machine of claim 1, wherein leakage flux from end windings of the stator coil windings is suppressed.

5. The segmented-rotor switched reluctance electric machine of claim 1, wherein thermal stress from end windings of the stator coil windings is suppressed.

6. The segmented-rotor switched reluctance electric machine of claim 1, wherein the radial magnetic elements have a concave shape.

7. The segmented-rotor switched reluctance electric machine of claim 1, wherein the segmented rotor comprises a plurality of non-magnetic frame segments each of which has a concave shape.

8. The segmented-rotor switched reluctance electric machine of claim 1, wherein unidirectional excitation for the segmented-rotor switched reluctance electric machine is utilized.

9. The segmented-rotor switched reluctance electric machine of claim 8, further comprising asymmetrical switching bridges coupled to the segmented-rotor switched reluctance electric machine.

10. The segmented-rotor switched reluctance electric machine of claim 1, wherein the plurality of stator slots comprise 8 stator slots and the plurality of radial magnetic elements comprise 14 rotor poles.

11. A method of operating a segmented-rotor switched reluctance electric machine, comprising:
    concurrently exciting two adjacent stator coil windings of the segmented-rotor switched reluctance electric machine using 2 different phases of a four phase circuit,
    wherein radial flux and axial flux coexist in the segmented-rotor switched reluctance electric machine such that torque raises simultaneously from both radial magnetic elements and axial magnetic elements of the segmented-rotor cooperatively operating in conjunction with the two adjacent stator coil windings.

12. The method of claim 11, further comprising repeatedly concurrently exciting two adjacent stator coil windings of the segmented-rotor switched reluctance electric machine using 2 different phases of the four phase circuit.

13. The method of claim 11, wherein only conductors of the two adjacent stator coil windings close to a shaft of the segmented-rotor switched reluctance electric machine do not directly contribute to torque harvest.

14. The method of claim 11, further comprising suppressing leakage flux from end windings of the adjacent stator coil windings.

15. The method of claim 11, further comprising suppressing thermal stress from end windings of the adjacent stator coil windings.

16. The method of claim 11, further comprising increasing average torque by providing the radial magnetic elements having a concave shape.

17. The method of claim 11, further comprising reducing torque ripple by providing non-magnetic frame segments having a concave shape.

18. The method of claim 11, further comprising applying unidirectional excitation for the segmented-rotor switched reluctance electric machine.

19. The method of claim 18, further comprising adopting asymmetrical switching bridges in the four phase circuit.

20. A segmented-rotor switched reluctance electric machine comprising:
a stator comprising a set of front axial stator poles and a set of back axial stator poles axially disposed on either side of a radial stator structure, wherein the radial stator structure further comprises a set of flux tubes interconnecting a set of radial stator poles;
a rotor, coaxial with, exterior to and rotatably connected to the stator, comprising a set of non-magnetic frame segments and a set of magnetic segments;
wherein the non-magnetic frame segments further comprise a first set of axial frame segments disposed in a front plane, a second set of axial frame segments disposed in a back plane, and a set of radial frame segments interconnecting the first set of axial frame segments to the second set of axial frame segments,
wherein the front and back planes are co-planar and perpendicular to the rotor's axis of rotation, and wherein the front and back axial stator poles are parallel to the front and back planes;
wherein the magnetic frame segments further comprise a first set of axial magnetic segments rigidly connected between the first set of axial frame segments, a second set of axial magnetic segments rigidly connected between the second set of axial frame segments and a set of radial magnetic segments rigidly connected between the set of radial frame segments; and
a set of phase windings disposed adjacent the stator structure wherein each phase winding is wound between and around a pair of flux tubes; and wherein when the set of phase winding are energized both axial and radial flux linkages are generated to drive the electric machine.

* * * * *